US010241186B2

(12) United States Patent
Boyle et al.

(10) Patent No.: US 10,241,186 B2
(45) Date of Patent: Mar. 26, 2019

(54) COOPERATIVE AUTOMATIC TRACKING

(71) Applicant: H4 Engineering, Inc., San Antonio, TX (US)

(72) Inventors: Christopher T. Boyle, San Antonio, TX (US); Scott K. Taylor, San Antonio, TX (US); Alexander G. Sammons, San Antonio, TX (US); Gordon Jason Glover, Corpus Christi, TX (US)

(73) Assignee: H4 Engineering, Inc., San Antonio, TX (US)

( * ) Notice: Subject to any disclaimer, the term of this patent is extended or adjusted under 35 U.S.C. 154(b) by 853 days.

(21) Appl. No.: 14/630,524

(22) Filed: Feb. 24, 2015

(65) Prior Publication Data
US 2015/0241546 A1 Aug. 27, 2015

Related U.S. Application Data

(60) Provisional application No. 61/943,903, filed on Feb. 24, 2014.

(51) Int. Cl.
| G01S 3/28 | (2006.01) |
| H01Q 3/08 | (2006.01) |
| G06K 9/00 | (2006.01) |
| G06K 9/62 | (2006.01) |
| G11B 27/034 | (2006.01) |
| H04N 7/18 | (2006.01) |

(52) U.S. Cl.
CPC ............ *G01S 3/28* (2013.01); *G06K 9/00711* (2013.01); *G06K 9/627* (2013.01); *G11B 27/034* (2013.01); *H01Q 3/08* (2013.01); *H04N 7/18* (2013.01)

(58) Field of Classification Search
CPC ......... G01S 3/28; G11B 27/034; G06K 9/627; G06K 9/00711; H01Q 3/08; H04N 7/18
USPC ............................................................ 342/52
See application file for complete search history.

(56) References Cited

U.S. PATENT DOCUMENTS

| 6,075,482 A * | 6/2000 | Fukushima | H01Q 1/3275 342/359 |
| 6,323,817 B1 * | 11/2001 | Ramanujam | H01Q 1/288 342/352 |
| 6,433,736 B1 * | 8/2002 | Timothy | H01Q 1/18 342/359 |
| 6,618,008 B1 * | 9/2003 | Scholz | G01S 7/032 342/427 |
| 8,812,139 B2 * | 8/2014 | Liao | H04M 1/72519 381/92 |
| 2005/0136857 A1 * | 6/2005 | Yamamoto | G01S 3/30 455/101 |

(Continued)

*Primary Examiner* — Peter M Bythrow
*Assistant Examiner* — Helena H Seraydaryan
(74) *Attorney, Agent, or Firm* — Volk & McElroy, LLP; Michael D. Volk, Jr.

(57) ABSTRACT

A system and method are provided for automatic cooperative object tracking using gain comparison of antenna pairs facing different directions. In cooperative object tracking, the object is associated with a radiation source, or beacon, that emits radiation that is detected by the tracking system. The present invention makes use of antennas that are not highly oriented antennas but are characterized by having a steep drop in their gain profiles at a particular angle of incidence of the radiation that they detect.

15 Claims, 9 Drawing Sheets

(56) References Cited

U.S. PATENT DOCUMENTS

| | | | |
|---|---|---|---|
| 2007/0216579 A1* | 9/2007 | Cheng | H01Q 1/243 343/700 MS |
| 2008/0218414 A1* | 9/2008 | Hagerman | H01Q 1/246 342/368 |
| 2009/0289850 A1* | 11/2009 | Liu | H01Q 1/185 342/359 |
| 2010/0026578 A1 | 2/2010 | Furnanz et al. | |
| 2011/0025464 A1* | 2/2011 | Geng | G01S 5/021 340/10.1 |
| 2013/0128054 A1* | 5/2013 | Densham | H04N 5/23296 348/169 |
| 2013/0229528 A1* | 9/2013 | Taylor | G01S 3/7864 348/169 |
| 2014/0009632 A1* | 1/2014 | Glover | H04N 5/232 348/211.99 |

* cited by examiner

COOPERATIVE AUTOMATIC TRACKING

CROSS-REFERENCE TO RELATED APPLICATION

This application claims the benefit of U.S. Provisional Patent Application No. 61/943,903, filed Feb. 24, 2014, titled "COOPERATIVE AUTOMATIC TRACKING", the contents of which are hereby incorporated by reference in its entirety and are not admitted to be prior art with respect to the present invention by the mention in this cross-reference section.

BACKGROUND

This present invention is related to the field of orienting a pointing device at a beacon. The present invention is also related to the field of automatic cooperative object tracking (COP). The present invention is also related to the field of automatic video recording using line of sight (LOS) technology. This present invention is also related to monopulse amplitude comparison based radar tracking,

SUMMARY OF THE INVENTION

In a system for cooperative tracking of an object, a pointer (also referred to as a pointing device) is associated with a pan-tilt mechanism. Two (or more) antennas are associated with the pointer. A beacon is associated with an object to be tracked. The beacon emits an identifiable signal detectable by the antennas. A microcontroller compares the gains of the two antennas causes the pan-tilt mechanism to turn in the direction of the antenna with the higher gain. In the inventive system, pairs of small solid state antennas are oriented in substantially opposite directions.

BRIEF DESCRIPTIONS OF THE DRAWINGS

DETAILED DESCRIPTION

Figure 1:
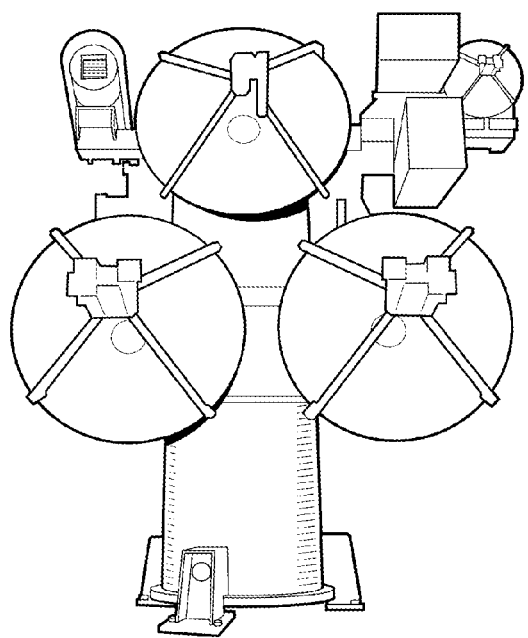
FIG. 1 shows an illustration of a traditional antenna based tracking system featuring three antennas.
Figure 2:
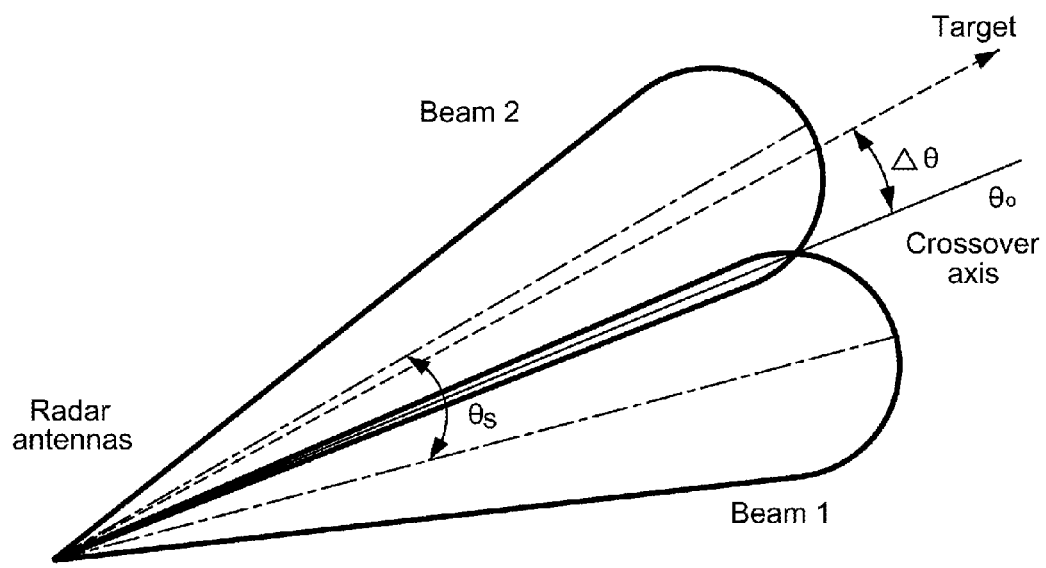
FIG. 2 is a schematic drawing explaining the operation of a traditional radar based tracking system with two directional antennas.

FIG. 1 shows an illustration of a traditional antenna based tracking system featuring three antennas. The direction of an incoming wave signal can be determined using directional antennas. The traditional Monopulse Amplitude Comparison (MAC) method is illustrated by FIG. 1 and FIG. 2. The application of this method requires the use of large, highly directional antennas, such as those depicted in FIG. 1. The antenna system depicted in FIG. 1 is very large and is only transportable with the use of a tractor-trailer due to its size. An example of the antenna system depicted in FIG. 1 is described in the following publication: C. T. Nadovich, J. F. Aubin, D. R. Frey, *An Instrumentation Radar System for Use in Dynamic Signature Measurements* (Jun. 1, 1992) (available at <http://www.microwavevision.com/sites/www.microwavevision.com/files/files/ORBIT-FR-Instrumentation-RadarSystem-92-06-02-Nadovich_0.pdf>).

FIG. 2 is a schematic drawing explaining the operation of a traditional radar based tracking system with two directional antennas. FIG. 2 shows how two radar antennas are oriented such that the angle between their maximum gain vectors is only a few degrees. Gain values of a received signal are compared between the two antennas of FIG. 2 and the angle $\Delta\theta$ of the incoming signal from a source denoted as "target" can be calculated as the deviation from the orientation of the system of the antennas. By definition, this orientation is the line of symmetry between the two gain vector distributions (Beam 1 and Beam 2), which is denoted as "Crossover axis" in FIG. 2. Thus, the crossover axis is at the angle $\theta_0$. For complete direction determination at least three antennas are needed; these may be thought of being grouped into two couples of antennas with orientation directions in two different (intersecting) planes. Highly directional antennas are too large to be used in small consumer electronic applications. An important feature of the MAC method is that the antennas are oriented in just slightly different directions, $\theta_s$ in FIG. 2. Here the size of the angle $\theta_s$ is tied to the directionality (acceptance angle) of the antennas such that there is some overlap between the gain curves Beam 1 and Beam 2 of the antennas.

The present invention is an implementation of line of sight ("LOS") technology for cooperative object tracking ("COT"). One important applications of the cooperative object tracking described herein is with automated video recording of freely moving subjects. In such an application, a subject is equipped with a "remote device" that may be carried or worn that is also a radiation transmitter. The "remote device" may also be referred to herein as a beacon or target. To track the subject, an automated cooperative object tracking system preferably comprises one or more receiver devices that receive the transmission of the beacon; the information contained therein is used to orient a pointing device, such as a camera, at the beacon and, by implication, at the subject. As will be described further herein, a multiplicity of beacons and/or a multiplicity of pointing devices may be used within the automated cooperative object tracking system.

One of the disadvantages of using highly directional antennas for object tracking is that if the object is significantly away from the direction of the antenna, the object is difficult to locate. In FIG. 2, the target is located at a direction where the gain of at least one of the antennas is useful to detect it. Otherwise, the system shown in FIG. 2 would not be able to locate the target easily, if at all. As will be described below, the present invention is advantageous in that the object is never "lost" because the antennas employed are not narrowly oriented as they are in FIG. 2.

Figure 3:
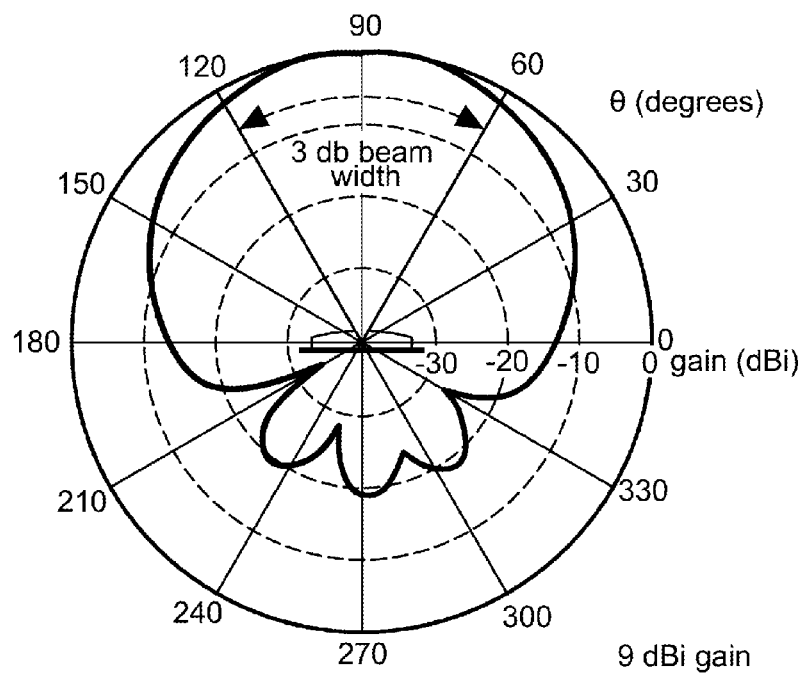
FIG. 3 is a graph showing patch antenna gain versus signal's angle of incidence.

According to a preferred embodiment hereof, the inventive system uses two small (centimeter sized) solid state antennas facing very different directions (in some cases close to 180 degrees (i.e., close to opposite directions) while in other cases the angle may be as small as 50 degrees) to determine which of the pair receives the transmitted signal stronger. An example of the antenna that may be used is a patch antenna. A patch antenna is a type of radio antenna with a low profile mountable on a flat surface. Generally, patch antennas have a flat, rectangular sheet or "patch" of metal mounted over a larger sheet of metal called a ground plane. A typical patch antenna gain pattern is shown in FIG. 3. FIG. 3 illustrates patch antenna gain vs. signal's angle of incidence. In FIG. 3, the antenna is in the center and it is oriented at θ=90 degrees. The over 60 degree wide (3 dB drop-off) maximum gain width is too broad for traditional MAC techniques. The inventive solution of the present invention only requires a steep gain slope which is a characteristic for small patch antennas at about 90 degrees from the surface normal. In FIG. 3 the steep gain slopes are at about +200 degrees and at about +340 degrees (which also may be thought of as −20 degrees). Also, patch antennas may be specially designed to have a sharp drop off in gain at other particular angles. The antennas constitute a pair (in other words, the antennas are paired), when the two antennas are directed in substantially different directions such that in the direction of the half angle between the antennas' orientation the angular gradient of the gains of the antennas is maximum. Because of the typical cylindrical symmetry of patch antennas, when the antennas are paired, there is naturally no gain overlap except within and near to the common plane of the axes (common central plane) of the paired antennas. This is important in those instances when the beacon is not within this plane or close to it. If this condition does not hold for a particular make and/or model of antennas, one can add additional features to their mounting to ensure that the no gain overlap substantially outside of the common central plane is fulfilled.

The invention described herein uses as an example radio frequency (RF) radiation being employed by the beacon. While this choice implies the use of particular equipment (RF antennas, etc.) it is not implied that using other type of radiation is not within the scope of the present invention. For example, infrared (IR) and ultrasonic radiation sources and detectors are available and it is a matter of technological detail and choice as to which type of radiation is best to employ. The wavelength choice within the RF band is of some significance; free availability of off the shelf equipment that does not require additional certification may be balanced by the desire of choosing wavelengths at which reflection effects (multipath errors) are minimal.

Additional mounting and shielding techniques may be used to cause the gain of the antenna to drop sharply at a particular angle. For example, mechanical barriers may be used such as extending the printed circuit board ("PCB") on which a patch antenna is mounted to block signals past a desired angle (e.g., 90 degrees). In this arrangement, the directionality of the antenna is not important. That is to say, it is not important in the same way as in the case of the example shown in FIG. 2 where a narrow maximum gain is necessary in the direction of the antenna. Here, on the contrary, the sharp drop-off of the gain along a particular direction is the requirement. The important feature is that the antenna's gain drops sharply as the signal's angle of incidence passes a certain angle.

Figure 4:
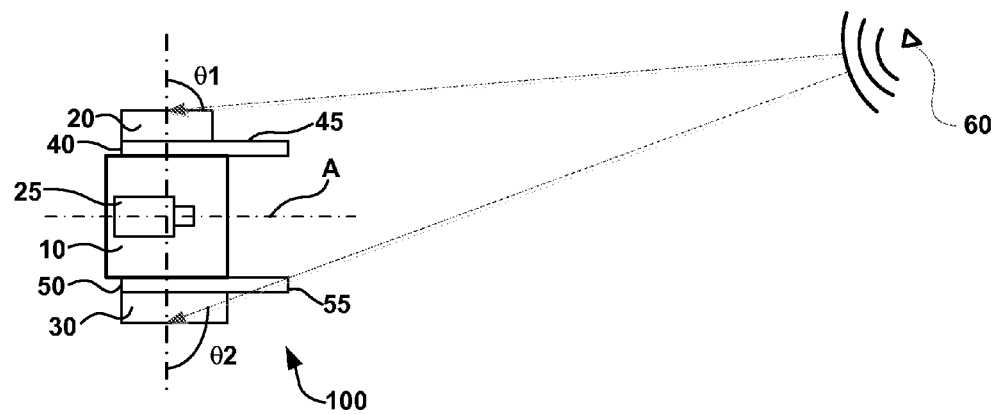
FIG. 4 is schematic representation of an antenna arrangement of an automated cooperative object tracking system in relation to a beacon according to a preferred embodiment of the present invention.

FIG. 4 is schematic representation of an antenna arrangement of an automated cooperative object tracking system in relation to a beacon according to a preferred embodiment of the present invention. FIG. 4 shows a top view of a preferred embodiment of automated cooperative object tracking system 100. In the preferred embodiment of FIG. 4, automated cooperative object tracking system 100 is used to orient camera 25 at a beacon 60. Beacon 60 is also a radiation transmitter. Automated cooperative tracking system 100 comprises a pair of patch antennas 20 and 30. In this example the patch antennas are mounted on two sides of panning unit 10 that can turn about an axis A (axis A is perpendicular to the plane of the drawing). Antennas 20 and 30 are mounted on PCBs 40 and 50, respectively. The sharp drop off of the gain of the antennas is enhanced by the shielding effect of extended PCB boards (an extended PCB is a PCB that has modifications of, for example, the size, thickness, coating, etc., to modify the gain profile of the attached antenna) on which each antenna is mounted, 45 and 55, respectively. Antenna 20 receives signal from beacon 60 at an angle θ1 that is less than the drop off angle while antenna 30 receives the signal from an angle θ2 that exceeds the drop off angle. As a result, antenna 20 receives a stronger signal than antenna 30 and a processing unit/microcontroller (not shown) compares the gain levels of the received signals by each antenna using, for example, the received signal strength indicator (RSSI) method. Depending on which antenna had the higher gain, the microcontroller will direct a turning mechanism (not shown) to turn panning unit 10 about axis A and rotate panning unit 10 in an attempt to keep the gain levels of the two antennas the same, i.e., in a direction that minimizes the difference between the signal intensities detected by antenna 20 and antenna 30 (in counterclockwise direction in the case of the example of FIG. 4).

Figure 5:
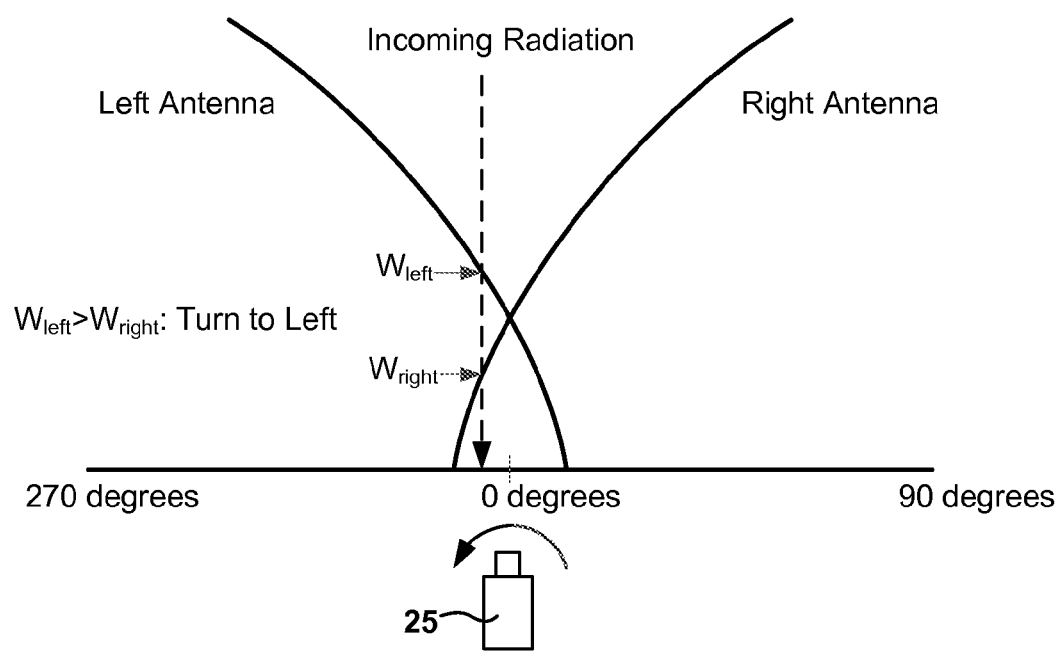
FIG. 5 is a schematic depiction of the angular distribution of gains of an antenna pair according to a first preferred embodiment of the present invention.

FIG. 5 is a schematic depiction of the angular distribution of gains of an antenna pair according to a preferred embodiment of the present invention. FIG. 5 illustrates the operation of the automated cooperative tracking system of FIG. 4 further. The orientation of the antennas is tied to the orientation of the camera 25. For clarity, the antennas, PCBs, etc., are not shown in FIG. 5. The orientation of the optical axis of camera 25 is defined as 0 degrees. When the incoming radiation reaches the antennas of the automated cooperative tracking system at an angle that is less than 0 degrees, the left side antenna will have a gain ($W_{left}$) that is greater than the gain of the right side antenna ($W_{right}$), and the panning unit with camera 25 attached turns to the left. In other words, the panning unit turns in the direction of the antenna with the higher gain. Note that the turning is described here with the antennas being fixed on the panning mechanism. Thus, to turn the camera toward the beacon, the antenna with the higher gain turns away from the beacon and the antenna with the lower gain turns toward the beacon. The turning stops when the gains on both antennas are equal. Thus, the relationship between gain and the turning of the camera can be generally stated as follows: If the left antenna gain is greater than the right antenna gain, then the camera is rotated to the left; if the right antenna gain is greater than the left antenna gain, then the camera is rotated to the right.

The two antennas may have slightly different gain patterns. In such a situation, a calibration procedure solves this issue. The calibration may be done by placing a transmitter directly in front of the panning unit (at 0 degrees, by definition) and taking measurements of the received signal strength of each antenna. In an ideal situation, the two antennas would receive the transmissions with equal strength when the transmitter is directly in front of the panning unit. Practically, however, the strength of the received signal may be different between the two antennas when the transmitter is directly in front of the panning unit. Using the calibration values accounts for the differences in gain patterns.

The antenna arrangement illustrated in FIG. 4 and FIG. 5 has the following deficiency: if the beacon is in the space hemisphere that is behind the camera (for example, close to 180 degrees) and there is a similar crossover of the antenna gains at another degree, for example at 180 degrees, then the panning device will turn the camera to this direction, which is not (and may be even the opposite of) the camera direction. This is not a problem if the system is always used for following targets that are in the front hemisphere with respect to the camera. In a preferred embodiment of the present invention, this problem is resolved by using three or more antennas in the same plane. This arrangement is illustrated by FIG. 6.

Figure 6:
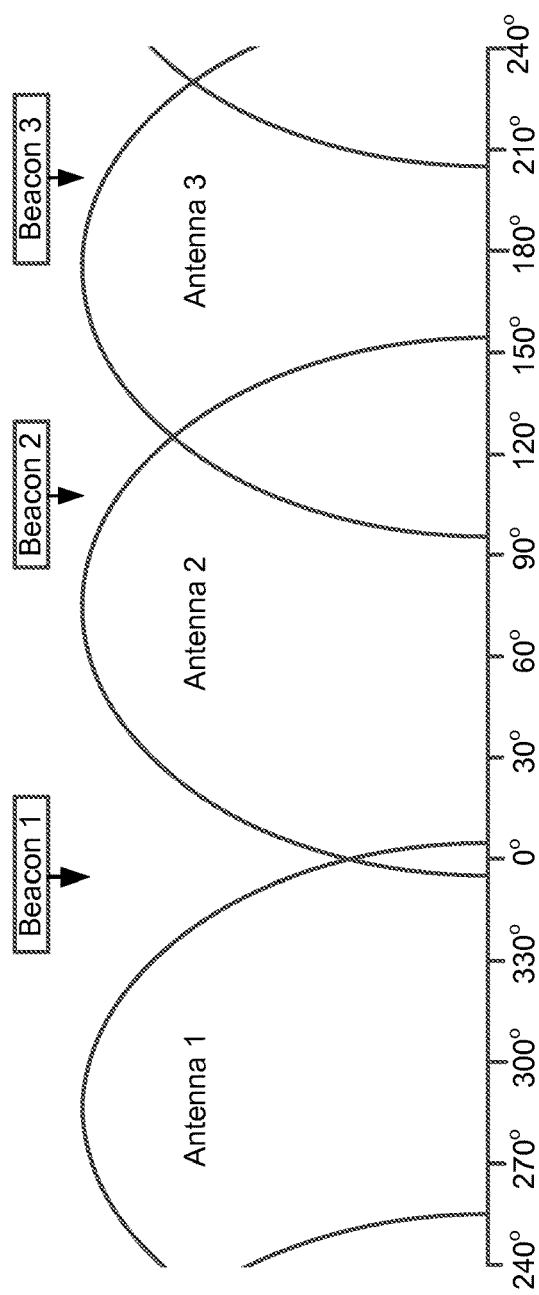
FIG. 6 is a schematic depiction of the angular distribution of gains of three antennas according to another preferred embodiment of the present invention

FIG. 6 is a schematic depiction of the angular distribution of gains of three antennas according to another preferred embodiment of the present invention. In FIG. 6 the three antennas are shown schematically having similar gain patterns that provide relatively high gains within a window of about 150 degrees. The gain windows have sharp edges, where the gain falls off and Antenna 1 and Antenna 2 are mounted such that their overlapping edges are at angle 0 degrees, which is the direction of the camera. Antenna 3 is mounted such that it has relatively wide overlaps both with Antenna 1 and Antenna 2.

To explain the operation of this antenna arrangement of FIG. 6, it is useful to consider three beacon positions. Regarding Beacon 1, the orientation process is no different from that discussed with respect to FIG. 5 above. Since the signal on Antenna 1 is stronger than on Antenna 2, a motor associated with the tracking unit will turn the tracking unit to the left and this process will continue until the signals on Antenna 1 and Antenna 2 are equal.

Regarding Beacon 2, both Antenna 2 and Antenna 3 register signal from Beacon 2. The tracking unit will turn to the right and this process will continue until Antenna 1 begins to register Beacon 2 and further until the signals on Antenna 1 and Antenna 2 are equal.

Regarding Beacon 3, Only Antenna 3 registers signal from Beacon 3. The tracking unit will begin to turn in a preprogrammed direction (either to the right, or to the left). Eventually, Beacon 3 will register on Antenna 1 (if the unit is turning to the left) or on Antenna 2 (if the unit is turning to the right). The turning will continue until Beacon 3 registers on both Antenna 1 and Antenna 2 and further until the signals on Antenna 1 and Antenna 2 are equal.

In a slight modification, the tracking unit of the automated cooperative tracking system may be programmed to sense and register whether the gain of Antenna 3 increases or decreases after the tracking unit first starts turning. If the gain increases, the tracking unit reverses its turning direction, but if the gain decreases, the tracking unit will keep turning in the initial direction. This modification may decrease the time that elapses between first registering Beacon 3 and finally having the camera oriented at this beacon.

It is important to realize that the antenna arrangement of the automated cooperative tracking system of the present invention is not limited to three antennas. One may use four or more antennas that may have narrower gain windows, the advantage being that such antennas may have higher gains. If there are N antennas numbered from 1 to N from left to right and a beacon registers on antenna M, then, if $M<\frac{1}{2}N$, the tracking unit will turn to right, but if $M>\frac{1}{2}N$, it will turn to left. In either case the tracking unit will keep turning until both Antenna 1 and Antenna N register signal from the beacon and then until the signal registered is equal on both antennas. In the remainder of this disclosure we will refer to such antenna systems as Paired Broad Gain Antenna systems, or PBGA systems, irrespective of the number (two or more) of antennas that are actually in the system. It should be noted that to guide a tracking system both in pan and tilt directions, two PBGA systems must be employed preferably arranged orthogonally (but orthogonal arrangement is not necessary). Further, recognizing that in a single system Antenna 1 and Antenna N constitute the antennas that make it a paired antenna system, we will use the term "paired antennas" or "antenna pairs" to describe these two antennas within a PBGA system.

Figure 7:
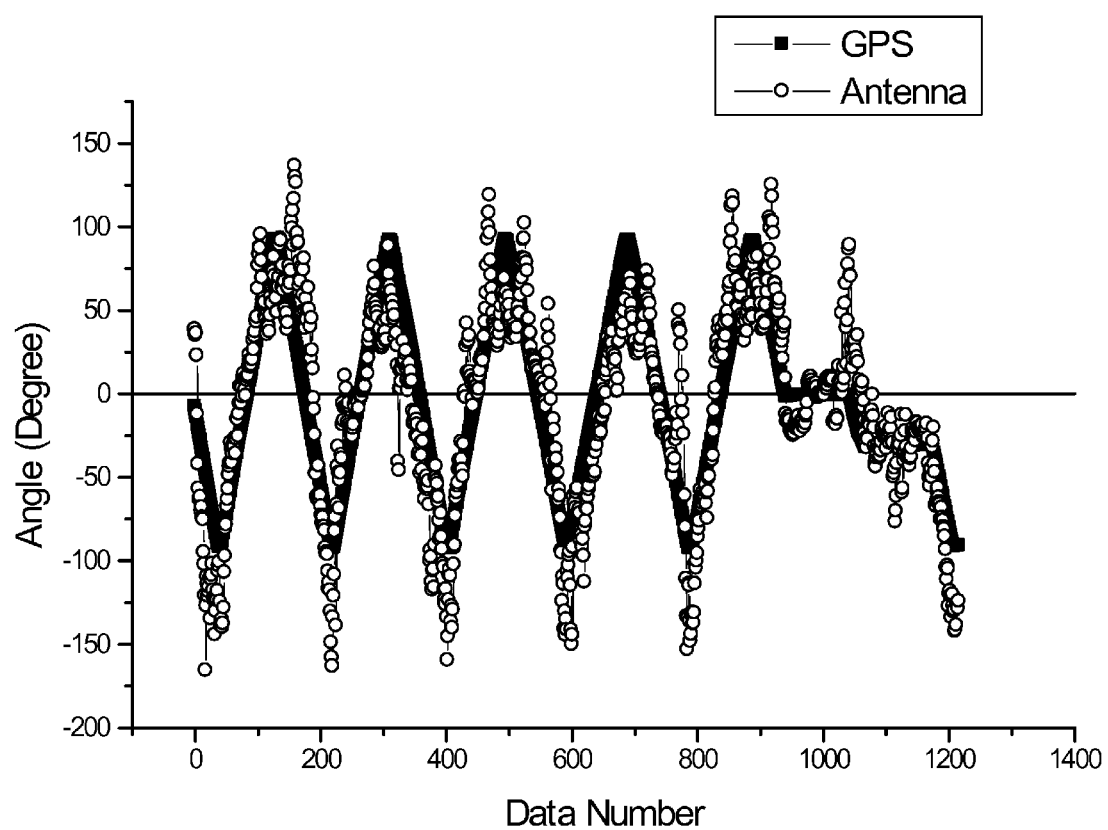
FIG. 7 is a graph depicting the change of the angular location of a beacon orbiting a pointing device as detected according to the inventive method hereof and as deduced from GPS location detection data.

FIG. 7 is a graph depicting the change of the angular location of a beacon orbiting a pointing device as detected according to the inventive method hereof and as deduced from GPS location detection data. The graph of FIG. 7 shows experimental data regarded as proof of concept for the automated cooperative object tracking system and method of the present invention. To obtain the data shown in FIG. 7, a beacon was equipped with both a radio transmitter and a GPS antenna. A pair of off-the-shelf TO-Link® TL-ANT2409A antennas were used as the receivers, in keeping with the arrangement illustrated in FIG. 4. The antennas were stationary and the beacon was moved around to position it at different angles with respect to the antennas. The angular positions of the beacon were recorded using the GPS signal and are shown as black squares. The apparent angular positions of the beacon were also measured using the inventive method and are shown as empty circles in FIG. 7. Considering that there were no measures taken to filter out electronic and other noise, or to optimize the apparatus in any respect, the data show an acceptable degree of agreement between the angular positions deduced from GPS locating and those obtained using the inventive apparatus and method.

To orient a pointing device at a source of radiation in a three-dimensional space, one has to turn the pointing device about two axes that may be referred to as pan and tilt axes. The example illustrated in FIG. 4 may be regarded as either the pan portion or the tilt portion of such a pan and tilt apparatus. In one embodiment the tilt portion of the apparatus works essentially on the same principles as described in conjunction with FIG. 4 and FIG. 5. However, there are a few more details useful to consider. To accomplish the task of orientation, one may use an apparatus comprising a panning unit mounted on a base, such as, for example, a tripod, and a tilting unit mounted on the panning unit. If the antennas for panning are mounted on the sides of the panning unit as described and shown above in FIG. 4, then the incoming signal from a moving radiation source that is at times at a higher elevation and at other times is at a lower elevation arrives at the antennas at varying angles. In such a situation, the characteristics of the antennas may not be the same in all these directions. This may defeat the calibration described above and may lead to inaccuracies in pointing. To avoid this, it is preferable to mount both the pan and the tilt antennas on the tilt portion of the orienting apparatus.

Figure 8:
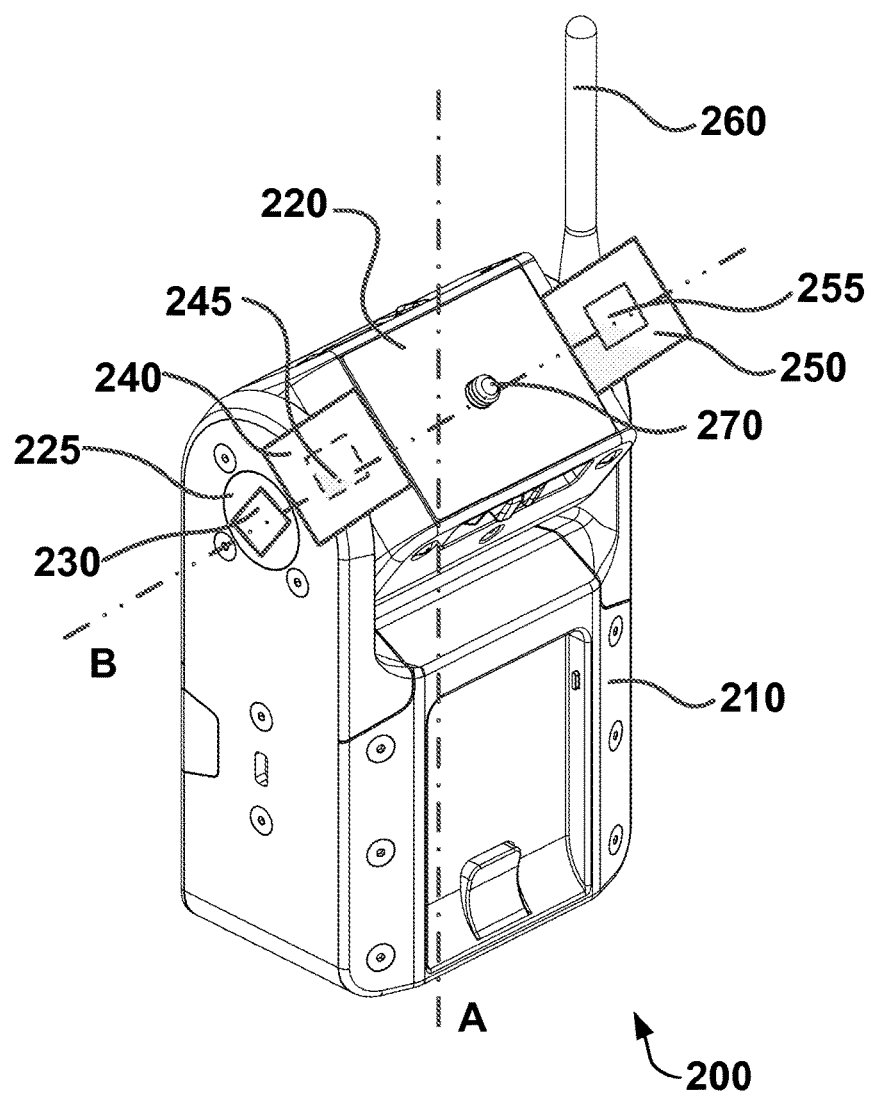
FIG. 8 is a perspective view of a pan and tilt tracking unit of an automated cooperative object tracking system having two pairs of directional solid state antennas according to a preferred embodiment of the present invention.

FIG. 8 is a perspective view of a pan-tilt mechanism of an automated cooperative object tracking system having two pairs of directional solid state antennas according to a preferred embodiment of the present invention. FIG. 8 illustrates one possible mounting arrangement of two patch antenna pairs on a pan-tilt mechanism 200. Panning mechanism 210 may be mounted on a tripod or other base via a rotatable shaft that permits the rotation of panning mechanism 210 around axis A shown as a dashed-dotted line. Panning mechanism 210 is operationally coupled to tilting mechanism 220. Tilting mechanism 220 is capable of rotation about axis B, also shown as a dashed-dotted line. A portion of tilting mechanism 220 is shaft 225 that serves as the mounting base for patch antenna 230, situated on the left end of shaft 225. Another patch antenna is similarly mounted on the right end of shaft 225 but is not shown in the drawing. Bases 240 and 250 hold patch antennas 245 and 255 that provide tilt information for the microcontroller (not shown) of pan-tilt mechanism 200. In keeping with the inventive method hereof and described with the aid of FIG. 4, one of the patch antennas is mounted facing up (antenna 255) and the other is mounted facing down (antenna 245, shown using dashed lines). As noted above, more antennas may be used. Pan-tilt mechanism 200 is also equipped with omnidirectional antenna 260 used to receive and to send radio signals. Screw 270 is used to mount a camera or other pointing device on pan-tilt mechanism 200.

The RF tracking method of the present invention may a have a high sampling rate but noisy output. Therefore, filtering algorithms are preferably employed to smooth the tracking data.

The signal emitted by beacon (e.g., beacon 60 FIG. 4) preferably carries a code that makes it distinguishable from any otherwise similar background radiation.

Figure 9:
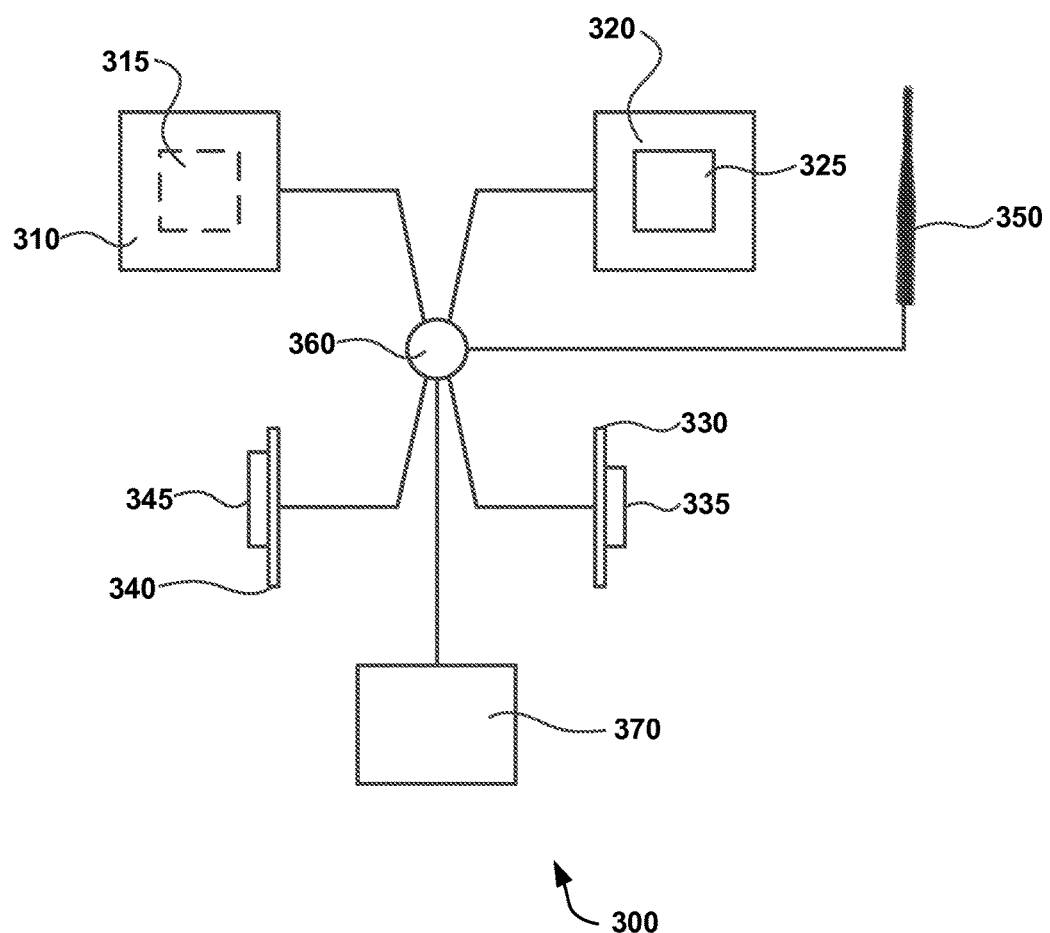
FIG. 9 is a schematic drawing of a wiring diagram of antennas and other components of an automated cooperative object tracking system according to a preferred embodiment of the present invention.

FIG. 9 is a schematic drawing of a wiring diagram of antennas and other components of an automated cooperative object tracking system according to a preferred embodiment of the present invention. In the preferred embodiment illustrated by FIG. 9, all patch antennas are connected to a single amplifier and gain measurements are preferably carried out sequentially. In FIG. 9, automated cooperative object tracking system 300 comprises four patch antennas 315, 325, 335, and 345, and one non-directional antenna 350. All patch antennas are shown together with PCBs 310, 320, 330, and 340 on which they are mounted, respectively. All antennas are connected directly or via the PCB to switch 360 that connects each antenna sequentially to microcontroller 370. Microcontroller 370 may preferably be of the type known as "RX MCU". As an example, the gains may be measured in the following order: left-facing antenna (antenna 345), right-facing antenna (antenna 335), up-facing antenna (antenna 325), and down-facing antenna (antenna 315, shown in dashed lines). This method is useful to minimize equipment cost, but it assumes that measurements may be carried out sufficiently fast. The system architecture shown and described in FIG. 9 may be modified such that only some antennas are grouped and queried in sequence. For example each PBGA system of a pan-tilt tracker may have its own grouping of antennas in which the antennas are read sequentially.

Generally, if the beacon moves with a velocity v in a direction perpendicular to the pointing vector R, wherein vector R points from the location of the pointing device to the beacon, then the angular velocity of the pointer must be $\omega=v/R$, where R is the length of vector R. If the beacon emits signals in time intervals $\tau$, then between two orientation readings the pointer must turn an angle $\phi=\omega\tau$. (The movement in the direction perpendicular to the pointing vector R is the worst case scenario; however this calculation neglects the time required to measure the gains and to translate such measurements into turning commands). Using the sequential gain measurement embodiment increases the effective time between readings by a factor of 4, to $4\tau$ (or, if antenna 350 requires equal time, $5\tau$). Whether this is acceptable for a particular purpose depends on the expected velocities of the beacons and on the other technical characteristics of the system.

It is noted that techniques exist (e.g., RF ranging and IR intensity measurement) that can yield information concerning the distance between the pointer and the beacon, i.e., the length R. Thus, R is assumed to be known. It is also noted that the combined knowledge of the direction between the pointer and the beacon and of the distance between them is sufficient to know their relative positions relative locations). In a preferred embodiment of the present invention, cameras that follow or track a beacon are preferably automatically turned on and off based on the beacon's proximity to the camera, or to a particular camera if more than one camera is used.

In a preferred embodiment of the present invention, the beacon is preferably tracked using multiple pointing devices and each pointing device itself may also be used as a beacon. When the distance between any two of the pointers is known, it is possible to determine the locations of all other pointers. This may be done during a setup procedure before actual tracking and filming starts using the systems and methods disclosed herein. Setup of such a system comprises determining angles between the directions of any second and third pointers with respect to a first pointer and then using geometrical calculations triangulation). Once the locations of all pointers are known, the location of the beacon may be determined using orientation data from any two of the pointers. Thus, if multiple pointers can track the same beacon, the location of the beacon may be determined using multiple sets of independent data. This opens the possibility of using such data to determine the beacon's location with high certainty and to eliminate multipath effects. Eliminating multipath effects is particularly important when such a system is used indoors where walls can reflect radio waves.

In another preferred embodiment of the present invention, beacon 60 is also equipped with one or more inertial measurement units (IMUs). Locating/orienting techniques are prone to errors (e.g., multipath errors and blocked signals. These location errors can be reduced using one or more IMUs on the beacon. The IMU measures the beacon's accelerations, and the acceleration data can be transmitted to the orienting pan and tilt unit to be used by the microcontroller to supplement the measurements of position of the beacon. For example, a 3-axis accelerometer placed on the transmitter can send information relating to the magnitudes of accelerations experienced by the beacon (also called "motion indication values" ["MIVs"]). The filter settings on the pan and tilt unit may be adjusted in real time based on the MIVs received such that if an instantaneous location determination is far from the previous location indications, and the MIV is reporting low values of accelerations, it is likely the new signal is the result of a multi-path reflection. Such a signal should either be ignored or heavily filtered. In another example, using a 6-axis IMU (meaning a 3-axis accelerometer and 3-axis gyroscope), an estimate for distance traveled over a short period of time may be calculated. However the direction the beacon moved would not be known. The transmitter associated with the beacon could tell the pan-tilt unit that it moved a determined number of meters in the last second but not the direction of this movement. The microcontroller would then compare the new location estimate (based, for example, on LOS reading and distance measurement) to the distance estimate and the previous location and make sure that the location reading is reasonable.

In another preferred embodiment of the invention a 9-axis IMU (3-axis accelerometer, 3-axis gyroscope, 3-axis magnetometer) is used. With a 9-axis IMU, an estimate for both distance and direction over a short period of time can be calculated. A data fusion algorithm combines the two pieces of information, for example if the COT method detects movement of one meter and the IMU data predicts the movement was two meters over the same timeframe, the two values are averaged and the pointing device is instructed to point at the averaged value. The microcontroller uses such fused information for improving the overall location determination (to either detect or filter out errors caused by multipath, or aid in extrapolation when LOS is not available due to signal blocking).

In another preferred embodiment of the present invention, beacon 60 preferably emits circularly polarized radiation and the patch antennas are preferably designed to detect such radiation. Radiation that does not reach the patch antennas directly, i.e., radiation that is reflected from nearby objects, such as walls, will have lost the correct polarization and will be detected less.

In another preferred embodiment of the present invention, when the system is employed for automated video recording, the microcontroller of the automated cooperative object tracking system may be programmed to recognize movement patterns that are characteristic of certain activities. Such recognition may then be used to control recording parameters. For example, when an exciting moment is about to occur (such as when a surfer about to catch a wave), it would be desirable to have the automatic recording device change to, for example, a high resolution and faster frame rate to get better quality footage of the surfer and wave, and then revert back to a lower quality resolution and/or slower frame rate after the exciting event. If the microcontroller is programmed to detect when an exciting event is about to happen, location and velocity data can be used to detect an exciting event. For example, there are recognizable characteristics of IMU sensor data that can be used to detect that the surfer is likely about to catch a wave. When such characteristics are detected, the microcontroller preferably triggers the camera to record at a higher recording resolution and/or frame rate. One example of recognizable data would be aggressive paddling motions detected by an IMU located on the surfers arm. Paddling into a wave by a surfer is much more aggressive when compared with other paddling scenarios and occurs only for a short period of time (about one to five seconds).

Camera image stabilization algorithms that are optimized for stabilizing hand held video recording often do not work well (and are sometimes detrimental) when the camera is being pointed by an electromechanical camera aiming system since the motion characteristics of electromechanical camera aiming systems often are much different than those of human cameramen. In a preferred embodiment of the present invention, the microcontroller of the pan and tilt mechanism implements an image stabilization method that dampens high frequency vibrations but allows low frequency motions. This can be done using either mechanical or digital methods, or using a combination of both.

In another preferred embodiment of the present invention, cooperative object tracking (COT) is combined with video recognition (VR). For example, the system starts tracking using a COT method (i.e., the subject holds a tracking beacon and IR, RF, GPS, etc., are used to track the beacon). The VR software automatically learns to recognize the subject that is being tracked and the system starts to track based on a combination of VR and COT. After some time, the system only needs VR to track the subject. In a variation of this method, the subject spends a certain amount of time using the beacon and "teaching" the system to operate based on VR, then the use of the beacon is discontinued. One advantage of this method is that the beacon may be used less requiring less battery power permitting use of a smaller size beacon. A further advantage of this method is that the subject can become free from having to carry the beacon. In another embodiment, after the system "learns" to recognize the subject, the system "learns" to recognize other subjects of the same "class". Here "class" signifies, for example, a group of people engaged in similar activity (e.g., riding bicycles, surfing, etc.), or wearing similar clothing (e.g., uniforms as on a soccer team). Systems using class tracking may include a multiplicity of tracking cameras in a network that would follow members of the class based on their location (e.g., being within the soccer field, in the water, etc.), or other criteria (e.g., velocity, distance from the camera, etc.). Thus, the network of tracking cameras uses cooperative object tracking to start, but eventually uses the network's improved pixel tracking to track objects or events that are not being tracked with cooperative object tracking with the system.

Figure 10:
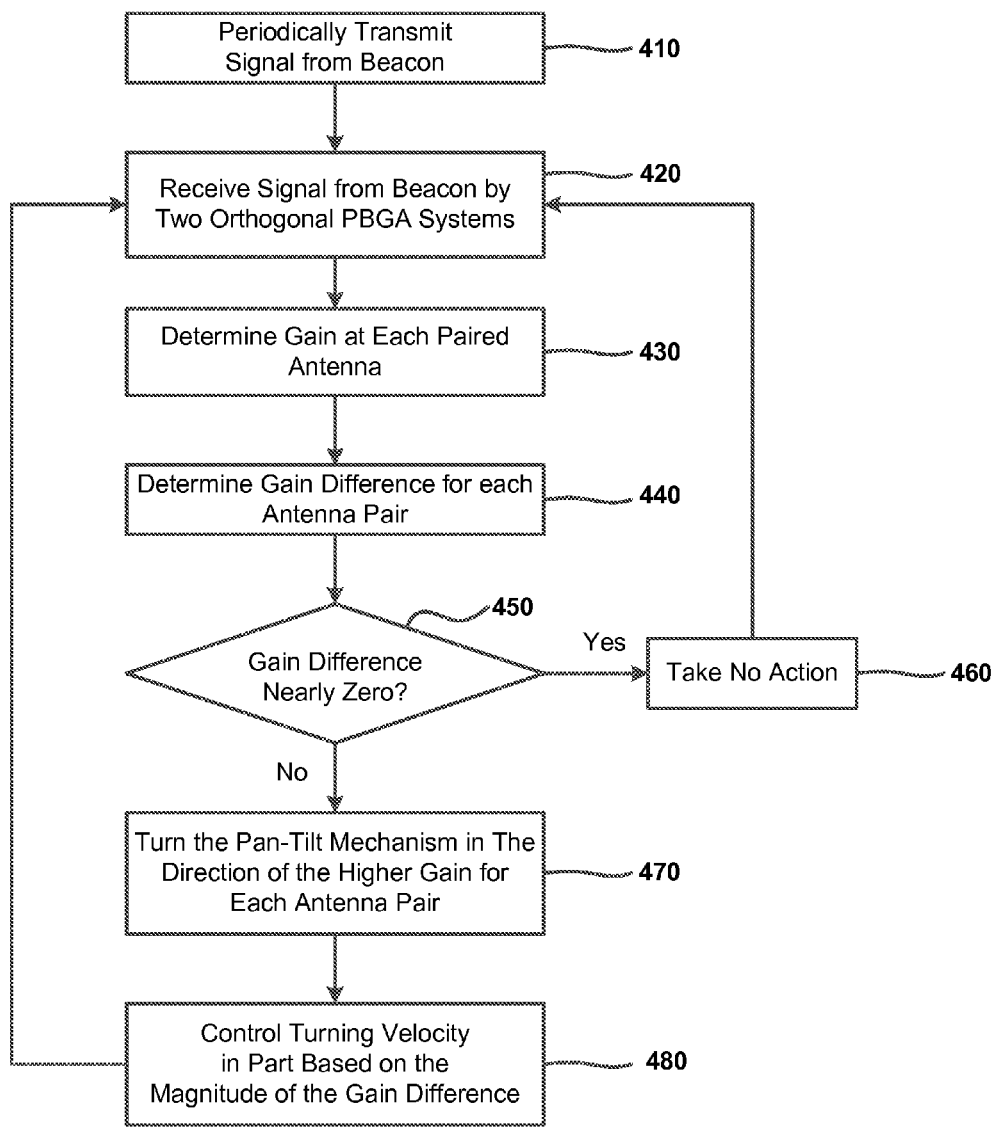
FIG. 10 is a flow diagram of a method of orientation according to a preferred embodiment of the present invention.

FIG. 10 is a flow diagram of a method of orientation according to a preferred embodiment of the present invention. Regarding such method, it is assumed that the tracking system is oriented nearly at the object such that the radiation signal emitted by the beacon is registered by both antennas of each antenna pair mounted on orthogonal planes. A beacon associated with the object to be tracked periodically transmits a signal in step 410. The signal preferably incorporates a unique identifier of the beacon. The signal is preferably a radio wave, but it may be electromagnetic radiation from a different part of the electromagnetic spectrum (e.g., infrared light) or a sound wave (e.g., ultrasound). The signal transmitted from the beacon is detected by appropriate antennas associated with a pointing device, such as a video camera, having a pan-tilt mechanism, in step 420. The antennas comprise two orthogonally arranged Paired Broad Gain Antenna (PBGA) systems. The gain of each paired antenna is determined in step 430. For each antenna pair the gain difference is determined algebraically, i.e., both the sign (i.e., which antenna has the higher gain) and the magnitude of the gain difference are determined in step 440. In step 450, the system determines if the gain difference is nearly zero or not. If the gain difference is nearly zero, no action is taken (step 460). If the gain difference is not nearly zero, then the method proceeds to step 470. In step 470, the pan-tilt mechanism of the pointing device turns in the direction of the higher gain of each antenna pair. That is, the gain difference detected within the panning plane causes the mechanism to pan if that difference is not nearly zero and the gain difference detected in the tilt plane causes the mechanism to tilt if that difference is not nearly zero. The definition of "nearly zero" is equivalent to defining a deadband that is useful to avoid jittery reaction to minute changes in the detected antenna gains. Such minute changes may be due to minute changes in the position of the object tracked or may be due to system noise. In step 480, turning velocity is controlled in part based on the magnitude of the gain difference detected between each pair of antennas. This is based on the recognition that when there is a higher difference in gain, the object orientation is farther from the current orientation of the pointer.

When orienting a camera at a moving object, like a person carrying a beacon, commands for orienting the camera have to be provided to the orienting mechanism with sufficient frequency. This frequency is, however still relatively low, in the range of three to 10 Hz in most cases. Also, a beacon associated with a person (for example, as a device attached to an armband) may move in such a way that the radiation intensity emitted in the direction of the receiving antennas may change rapidly. To avoid errors associated with such changes between the measurements of the gains of the antenna pair, one may want to do measurements in very quick succession, for example at a rate of 100 Hz. Using this as an example, one would generate 50 gain difference readings per second, but orientation commands to the pan-tilt mechanism that orient the pointing device/camera need to be provided only at a rate of about 5 Hz, for example. That would allow for an averaging of 10 gain difference readings before each turning command and a corresponding improvement of signal-to-noise ratio. Alternatively, Kalman filtering may also be employed.

In another preferred embodiment of the present invention, the tracking apparatus is a part of a system that comprises other similar apparatuses (automated cameramen) and also a human cameraman, or more generally, a human user in control of the system. The human user may or may not be a part of the action that is being filmed. The human user can determine when the action is worth recording or photographing. A problem with an automated cameramen is that they do not have the same intelligence as a human to determine when to start or stop filming. For example, automated cameramen will not inherently respond to a director yelling "action". The one or more automated cameramen in the present embodiment start or stop recording (or take photos) based on the remote control of a human. The remote control is activated when the human user is a cameraman and uses their camera such that the automated cameramen mimics what the human cameraman is doing. For example, when the human cameraman begins recording, a signal is sent to all the automated cameramen which also start recording.

In a yet another preferred embodiment of the present invention multiple tracking devices are interconnected to form a system wherein each tracking device utilizes data from all devices in a machine learning protocol to learn from each other so that tracking uses location and biometric data compared with pixel tracking and all the other types of tracking to further optimize the tracking and video recording process. As a result, a network of tracking devices will act as an array of eyes and ears that automatically senses and alerts to problems. Examples are: (a) a camera "sees" in its peripheral that a car accident occurred and automatically dials 911; (b) a camera that is part of a municipal network "sees" a police officer in trouble and alerts the police department; (c) a camera is following a surfer but senses a drowning victim in the background, or even recognizes whale breaching, and alerts the network.

In yet another preferred embodiment of the present invention, the tracking apparatus is used to recognize events. For example, a sporting event can be determined based on the types of motions detected (e.g., youth soccer). The inventive system of tracking devices may also preferably connect with a cellular company (such as Verizon) to detect their customers in the vicinity of an event based on user's cell phone location data. The company can reasonably assume that those customers are also interested in that type of event (e.g., youth soccer). Then anyone with a Verizon phone in the vicinity may be flagged as being interested in youth soccer and targeted for related advertising.

During the cooperative object tracking, video recognition algorithms may also be used for collecting additional customer data.

Figure 11:
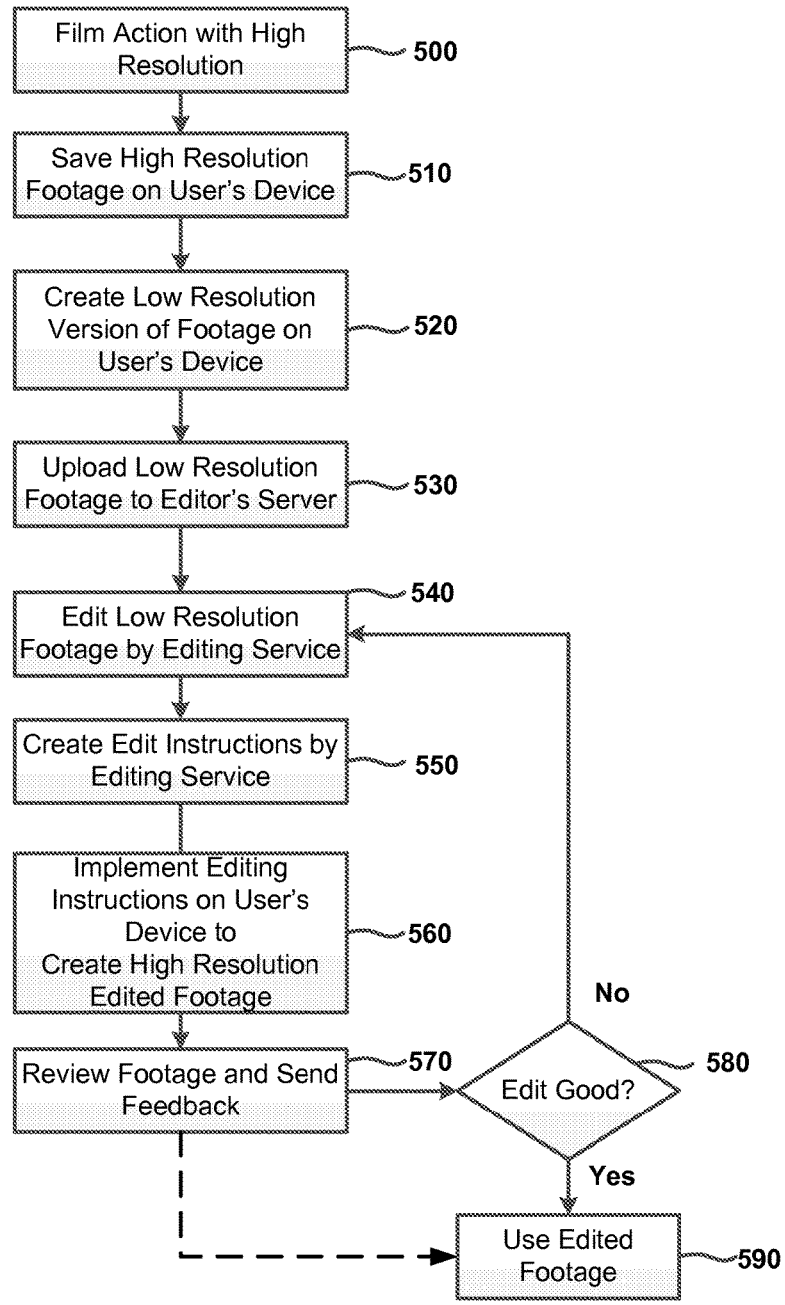
FIG. 11 is a flow diagram of an automated editing and publishing method of the footage recorded by the inventive system.

FIG. 11 is a flow diagram of an automated editing and publishing method of the footage recorded by the inventive system. A problem of uploading video footage to a remotely located editing service is that video footage files are large and time consuming to transfer. An inventive way to solve this problem is illustrated using FIG. 11. In this method the user films, using the inventive system and method hereof, footage in high resolution in step 500. The footage is saved on the user's device in step 510. The user's device creates a low resolution version of the footage in step 520, and uploads it to a remotely located server (computer) of an editing service in step 530. The editing service then edits the low resolution footage into "appealing video clips" in step 540. The editing software that the editing service uses then creates a set of specific editing instructions that are to be implemented on the high resolution version on the user's device in step 550. The instructions are sent to the user and are implemented on the user's device that has editing software capable of following the editing instructions generated in step 550 and replicates the appealing video clips(s) on the user's device using the high resolution video files (step 560). The result may be reviewed by the user in step 570. The user decides whether the edit is "good" or not in step 580. If not, the editing process may be repeated by returning to step 540. At this step, the user may provide editing suggestions, instructions, and the like to make the second round of editing improved. If the user is satisfied with the edit, the user uses the high resolution edited footage in step 590. For example, the user may upload the edited clip to a server for viewing by others.

One benefit of the method of FIG. 11 is that large, high resolution video files never needed to be uploaded for editing. The remotely located video editing service may be an automated service or a service performed by humans. Step 580 is optional as noted by the dashed line connecting step 570 with step 590. In a preferred embodiment, such automated editing service collects feedback data to improve its editing capabilities. As more people use the service and provide feedback, the quality of the editing service improves. The feedback could be based on users modifying the edited video clips on their own computers software. Data on the modifications which the user made is sent as feedback to the editing service to improve their editing algorithms.

Applicant hereby incorporates by reference in their entirety the following co-owned patent applications which may assist in understanding the present invention: U.S. patent application Ser. No. 13/801,336, titled "System and Method for Video Recording and Webcasting Sporting Events", PCT International Patent Application No. PCT/US2013/041187, titled "High Quality Video Sharing Systems", PCT International Patent Application No. PCT/US2013/070903, titled "Automatic Cameraman, Automatic Recording System and Automatic Recording Network", and U.S. patent application Ser. No. 14/600,177, titled "Neural Network for Video Editing".

Different embodiments, features and methods of the invention are described with the aid of the figures, however the particular described embodiments, features and methods should not be construed as being the only ones that constitute the practice of the invention and the described embodiments, features and methods are in no way substitutes for the broadest interpretation of the invention as claimed.

What is claimed is:

1. A system for automated cooperative tracking of an object, said system comprising:
   a pointer associated with a pan-tilt mechanism, wherein said pan-tilt mechanism has panning and tilting parts capable of turning around a panning axis and around a tilting axis, respectively, and said pointer has a pointing direction with respect to said panning and tilting parts;
   a first antenna pair associated with said pan-tilt mechanism, said first antenna pair comprising a first wide angle antenna and a second wide angle antenna, wherein said first and second wide angle antennas are fixed with respect to said pointer and point in substantially different directions within a plane perpendicular to the panning axis;
   a beacon, associated with the object, that emits an identifiable signal detectable by said first and second wide angle antennas; and
   a microcontroller that compares the gains of said first and second wide angle antennas and causes said pan-tilt mechanism to pan said pointer in the direction of the wide angle antenna with the higher gain.

2. The system for automated cooperative tracking of an object of claim 1, said first and second wide angle antennas characterized by having their gains decrease rapidly around and crossing over substantially at the pointing direction of the pointer within a plane perpendicular to the panning axis.

3. The system for automated cooperative tracking of an object of claim 2, said first and second wide angle antennas having substantially no gain overlap outside of said plane perpendicular to the panning axis.

4. The system for automated cooperative tracking of an object of claim 2, further comprising a second antenna pair associated with said pan-tilt mechanism comprising a third wide angle antenna and a fourth wide angle antenna, said third and fourth wide angle antennas are characterized by having their gains decrease rapidly around and crossing over substantially at the pointing direction of the pointer within a plane perpendicular to the tilting axis and having no gain overlap substantially outside of said plane perpendicular to the tilting axis.

5. The system for automated cooperative tracking of an object of claim 2, said pointer also comprising at least one additional wide angle antenna, wherein said at least one additional wide angle antenna points to a direction within the plane perpendicular to the panning axis of said pan-tilt mechanism.

6. The system for automated cooperative tracking of an object of claim 4, said pointer further comprising at least one additional wide angle antenna, wherein said at least one additional wide angle antenna points to a direction within the plane perpendicular to the tilting axis of said pan-tilt mechanism.

7. The system for automated cooperative tracking of an object of claim 6, said beacon further comprising at least one inertial measurement unit and a transmitter to broadcast data obtained by said at least one inertial measurement unit to said pointer.

8. A method of automated cooperative tracking of an object, said method comprising the steps of:
   emitting an identifiable signal from the location of the object to be tracked;
   providing a tracking mechanism having at least a panning axis equipped with at least a first wide angle antenna and a second wide angle antenna mounted on the tracking mechanism within a plane perpendicular to the panning axis such that the first and second wide angle antennas point in substantially different directions and constitute a first set of paired antennas;
   detecting signals emitted from the object to be tracked using the wide angle antennas, wherein the detected signal on each of the first and second wide angle antennas characterized by an intensity;
   turning the tracking mechanism such that both wide angle antennas detect signals with non-zero intensity;
   comparing the signal intensities detected by the first and second wide angle antennas and turning the tracking mechanism in the direction of the first wide angle antenna if it is detecting higher signal intensity than the second wide angle antenna and turning the tracking mechanism in the direction of the second wide angle antenna if it is detecting higher signal intensity than the first wide angle antenna;
   stopping the tracking mechanism if the signal intensities detected by the first wide angle antenna and by the second wide angle antenna are substantially the same and not zero.

9. The method of automated cooperative tracking of an object of claim 8, further comprising the steps of:
   providing a second set of paired wide angle antennas, wherein the second set of paired wide angle antennas is mounted substantially orthogonally to the first set of paired antennas;
   turning the tracking mechanism along a tilting axis such that at both of the second set of paired wide angle antennas detect signals with a non-zero intensity;
   comparing the signal intensities detected by the second set of paired wide angle antennas and turning the tracking mechanism in the direction of the wide angle antenna that is detecting higher signal intensity; and
   stopping the tracking mechanism if the signal intensities detected by each of the second set of paired wide angle antennas are substantially the same and not zero.

10. The method of automated cooperative tracking of an object of claim 9, also comprising the steps of:
    providing additional unpaired wide angle antennas pointing in substantially different directions than the paired wide angle antennas; and
    turning the tracking mechanism such that the signal intensities detected by the additional unpaired wide angle antennas is substantially zero.

11. The method of automated cooperative tracking of an object of claim 8, further comprising the step of controlling the turning velocity of the tracking mechanism at least in part based on the difference of signal intensities detected by the first and second wide angle antennas.

12. The method of automated cooperative tracking of an object of claim 8, further comprising the step of averaging the signal intensities detected by the first and second wide angle antennas over a time period of about 200 ms.

13. The method of automated cooperative tracking of an object of claim 8, further comprising the steps of:
    detecting movements of the object using inertial measurement units; and
    calculating expected directions for the tracking mechanism based on the detected movements of the object.

14. The method of automated cooperative tracking of an object of claim 8, further comprising the step of providing the tracking mechanism equipped with two orthogonally positioned antenna pairs; each antenna pair consisting two wide angle antennas mounted on the tracking mechanism, wherein said wide angle antennas of each pair are characterized by pointing in substantially different directions in a plane and having their gains decrease rapidly around and crossing over substantially within that plane.

15. The system for automated cooperative tracking of an object of claim 1, said pointer comprising a camera.

* * * * *